US007856416B2

(12) United States Patent
Hoffman et al.

(10) Patent No.: US 7,856,416 B2
(45) Date of Patent: Dec. 21, 2010

(54) AUTOMATED LATENT STAR SCHEMA DISCOVERY TOOL

(75) Inventors: Virginia Hoffman, Austin, TX (US); James M. McArdle, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 414 days.

(21) Appl. No.: 12/107,141

(22) Filed: Apr. 22, 2008

(65) Prior Publication Data

US 2009/0265335 A1    Oct. 22, 2009

(51) Int. Cl.
 *G06F 17/30* (2006.01)
(52) U.S. Cl. ......................... 707/605; 707/804
(58) Field of Classification Search .............. 707/605, 707/804
 See application file for complete search history.

(56) References Cited

U.S. PATENT DOCUMENTS

| 6,778,996 | B2 | 8/2004 | Roccaforte |
| 6,829,621 | B2 | 12/2004 | Keller |
| 7,058,640 | B2 | 6/2006 | Le |
| 7,716,170 | B2 * | 5/2010 | Farag ............................. 1/1 |
| 2002/0107840 | A1 * | 8/2002 | Rishe .......................... 707/3 |
| 2003/0115211 | A1 | 6/2003 | Chen et al. |
| 2003/0120651 | A1 * | 6/2003 | Bernstein et al. ................ 707/6 |
| 2004/0260715 | A1 * | 12/2004 | Mongeon et al. ............ 707/101 |
| 2005/0004918 | A1 | 1/2005 | Platt |
| 2005/0050069 | A1 * | 3/2005 | Vaschillo et al. ............ 707/100 |
| 2006/0085489 | A1 * | 4/2006 | Tomic et al. ................. 707/200 |
| 2006/0206512 | A1 | 9/2006 | Hanrahan et al. |
| 2006/0242142 | A1 * | 10/2006 | Coen et al. ...................... 707/6 |

FOREIGN PATENT DOCUMENTS

WO    2004112301 A2    12/2004

* cited by examiner

*Primary Examiner*—James Trujillo
*Assistant Examiner*—William Spieler
(74) *Attorney, Agent, or Firm*—Dillon & Yudell LLP (57) ABSTRACT

A method, computer program product, and data processing system for computer-aided design of multidimensional data warehouse schemas are disclosed. A preferred embodiment of the present invention provides a software tool for identifying a latent star schema structure within an existing database. This software tool performs a heuristic analysis of the existing database schema to locate potential keys and measurement fields. Database tables within the existing schema are scored heuristically as to their suitability as fact tables based on the key candidates and measurement fields. For each fact table, other tables from the existing schema are identified as possible dimension tables. Data from the database is then used to test the suitability of the fact tables and dimension tables. The identified fact tables and their associated dimension tables are then reported to the user to reveal a basic star schema structure, which can be used as a basis for further design.

20 Claims, 9 Drawing Sheets

```
CREATE TABLE INVOICES          ⟵ 302
     ( INVNO INTEGER NOT NULL,
       CUSTID INTEGER,
       ORDERDATE DATE,
       SHIPDATE DATE,    ⟵ 304
     PRIMARY KEY(INVNO),                              ⟵ 306
     FOREIGN KEY(CUSTID) REFERENCES CUSTOMERS(CUSTID));

CREATE TABLE CUSTOMERS
     ( CUSTID INTEGER NOT NULL,
       ADDR VARCHAR(30),
       CITY VARCHAR(15),
       STATE CHAR(2),
       ZIP INTEGER,
     PRIMARY KEY(CUSTID));

CREATE TABLE ITEMS
     ( ITEMID INTEGER NOT NULL,
       DESCR VARCHAR(30),
     PRIMARY KEY(ITEMID));

CREATE TABLE ITEMORDERS
     ( INVNO INTEGER NOT NULL,
       ITEMID INTEGER NOT NULL,
       QTY INTEGER,
       PRICE MONEY,
     PRIMARY KEY(INVNO,ITEMID),
     FOREIGN KEY(ITEMID) REFERENCES ITEMS(ITEMID));
```

Figure 3

```
CREATE TABLE INVOICES
    ( INVNO INTEGER,
      CUSTID INTEGER,
      ORDERDATE DATE,
      SHIPDATE DATE);

CREATE TABLE CUSTOMERS
    ( CUSTID INTEGER
      ADDR VARCHAR(30),
      CITY VARCHAR(15),
      STATE CHAR(2),
      ZIP INTEGER);

CREATE TABLE ITEMS
    ( ITEMID INTEGER,
      DESCR VARCHAR(30));

CREATE TABLE ITEMORDERS
    ( INVNO INTEGER,
      ITEMID INTEGER,
      QTY INTEGER,
      PRICE MONEY);
```

Figure 4

```
SELECT SUM(QTY*PRICE)

FROM       INVOICES, CUSTOMERS, ITEMORDERS
                                                    ⎫— 502
    WHERE      INVOICES.INVNO=ITEMORDERS.INVNO AND
               INVOICES.CUSTID=CUSTOMERS.CUSTID AND
               STATE='TX' AND                       ⎫— 504
               CITY='AUSTIN';
```

8.7  9.6
 Order Date | Ship Date

5.4  3.1
 Order Date | Ship Date

9.6
 Address | City | State | ZIP 3.1
 Address | City | State | ZIP 8.7
 Item Desc.

5.4
 Item Desc.

8.7  8.7
 Qty | Price

4.2  Inv. No. | Cust. ID | Order Date | Ship Date 4.1  Cust. ID | Address | City | State | ZIP 3.5  Item No. | Item Desc.

8.1  Inv. No. | Item No. | Qty | Price — 1102

AUTOMATED LATENT STAR SCHEMA DISCOVERY TOOL

BACKGROUND OF THE INVENTION

1. Technical Field

The present invention relates generally to automated and/or computer-assisted database design. In particular, the present invention is directed to a method, computer program product, and data processing system for discovering a latent star schema structure in an existing relational database.

2. Description of the Related Art

Figure 1:
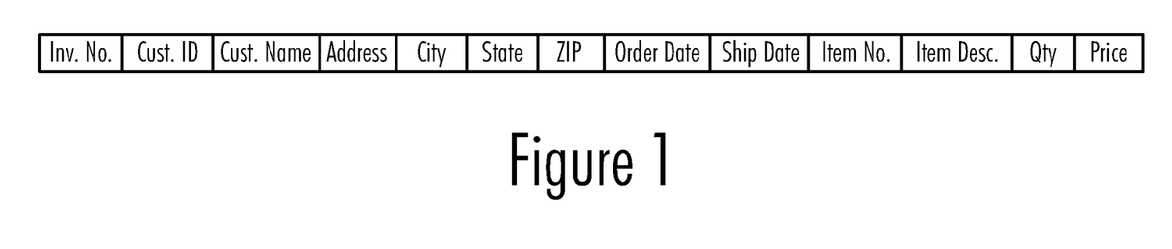
FIG. 1 is a diagram of a relational database schema.

One of the most important applications of computer technology is in organizing, storing, and retrieving vast quantities of information. To this end, the field of database management systems has evolved to a high state of maturity. The foundation of most modern database management systems is the relational database concept. Relational databases organize information in the form of tables, which may be thought of as two-dimensional grids, where each entry in the table (called a "tuple") forms a row and each entry contains a plurality of fields or attributes (columns), representing different component pieces of information. FIG. 1 illustrates the organization of a single database table for recording product orders for a business, where each column of the table represents a different piece of information, such as the invoice number, item number for a particular item, quantity purchased of that item, customer information, etc.

From FIG. 1, it should be apparent that this sort of single-table database can be inefficient from a storage standpoint in that it may store a significant amount of duplicate information. For example, in the table depicted in FIG. 1, if a single customer purchases multiple items as part of the same order, a separate tuple in the table is needed for each item (i.e., each item requires a separate row in the table). However, each of these tuples would duplicate the customer's address information, the order date, etc., resulting in a significant amount of redundancy. This redundancy, in addition to increasing storage requirements, also makes performing alterations on the data more complicated, since any modification to one of these duplicated items of information must also be duplicated for each tuple in which the item to be altered appears.

This issue is typically dealt with within the relational database framework through what is known as "database normalization." Through database normalization, a single database may be broken into multiple tables to avoid redundant storage while preserving the informational integrity of the database. According to relational database theory, there are a number of "normal forms" (1st Normal Form, 2nd Normal Form, 3rd Normal Form, 4th Normal Form, Boyce-Codd Normal Form, etc.) in which a database schema can be organized, each of which preserves certain functional dependencies between attributes. A functional dependency exists when the value of one or more attributes determines the value of another attribute. For example, the identity of a particular customer would functionally determine the customer's address. Likewise, an invoice number would functionally determine the identity of the customer being invoiced.

Relational databases rely heavily on the concept of primary keys and foreign keys to interrelate tables with one another. A primary key of a relational database table is an attribute or group of attributes of the table that uniquely identifies each entry in the table. An example of a primary key in a table of university students would be "Student ID No.," since every student in a university is (or at least should be) uniquely identified by his/her student identification number.

Obviously, different tables will usually have different primary keys. However, a key concept of the relational database model is that of a "foreign key." A foreign key is an attribute or group of attributes of one table that serves as a primary key of a second table such that the foreign key is used to reference entries of the second table.

Figure 2:
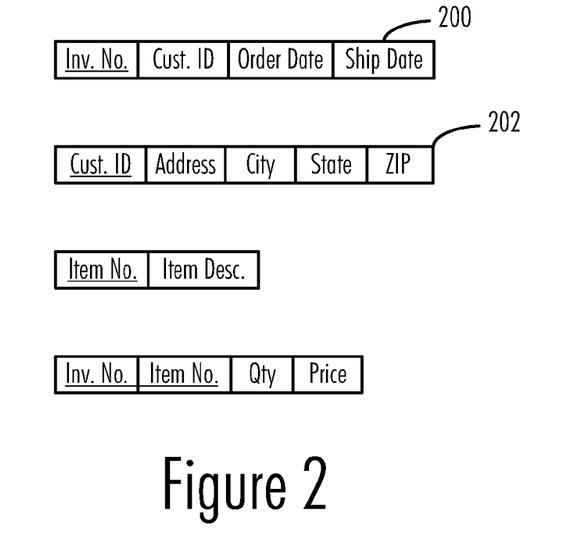
FIG. 2 is a diagram of a normalized relational database schema in the third normal form.

For example, FIG. 2 shows a normalized relational database schema in the third normal form containing the same attributes as the single-table schema in FIG. 1. The single table of FIG. 1 is here replaced by four tables. Each of the four tables has a primary key (indicated in FIG. 2 by underlining those attributes). The attribute "Cust. ID" is a primary key of table 202 (the "customers" table). In table 200 (the "invoices" table, where each entry represents a particular invoice), there is also an attribute "Cust. ID," which is a foreign key referencing the "Cust. ID" primary key of table 202, thus referring to the customer for a particular invoice.

Many relational databases are defined using "Structured Query Language" or (SQL), a declarative language for defining, updating, and querying relational databases. The database described in FIG. 2 in graphical form may be specified in SQL as shown in FIG. 3 through a series of "CREATE TABLE" commands, each of which defines a particular table in the relational database schema.

Figure 3:
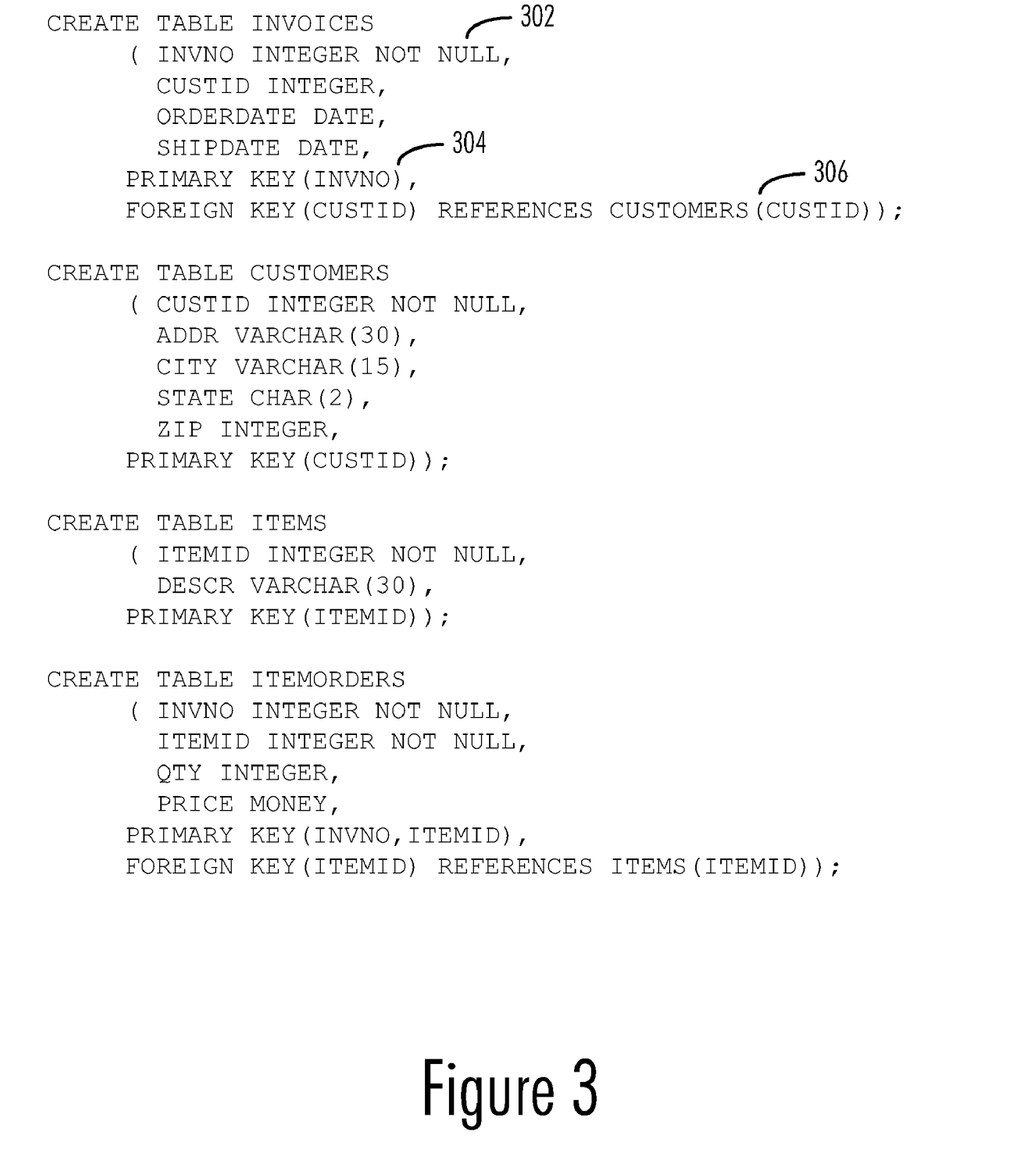
FIG. 3 is a diagram of an implementation in Structured Query Language (SQL) of a normalized relational database schema in the third normal form.

As shown in FIG. 3 it is possible to identify constraints on particular attributes. For instance, at line 302 in FIG. 3, the constraint "NOT NULL" is specified for the "INVNO" attribute (representing an invoice number), meaning that the "INVNO" attribute in the "INVOICES" table is not allowed to contain null values (i.e., every invoice in the "INVOICES" table must contain an invoice number). Other constraints related to whether certain attributes are primary keys or foreign keys, such as line 304, which states that "INVNO" is a primary key in the "INVOICES" table, and line 306, which states that the attribute "CUSTID" in the "INVOICES" tables (representing a customer ID number) is a foreign key that references the "CUSTID" attribute of the "CUSTOMERS" table.

The primary purpose of specifying these constraints is so that the database management system can verify that the data inserted into the database tables meets these constraints. Another side-benefit to explicitly specifying the constraints is that it provides some level of self-documentation of the database's structure. However, when constraints are explicitly defined in the database, the computational overhead associated with verifying the database's consistency with respect to those constraints can be substantial. For that reason, many databases in practical use are specified without explicit constraint definitions, as in the example provided in FIG. 4, which is an SQL listing illustrating how the same database structure defined in FIG. 3 can be defined without explicit constraints.

While traditional normalized relational databases are generally well adapted to database update operations (e.g., addition, deletion, and modification of data in the database), the advantages of the traditional normalized relational database (e.g., decreased redundancy, more efficient updates, etc.) often come at the expense of query efficiency/complexity. This occurs largely because query processing often requires the evaluation of "join operations," where attributes in one table are matched to their counterparts in another table in order to reconstruct a single de-normalized table from the normalized set of tables. In a well-normalized relational database, it is often necessary to construct complex multi-join queries to obtain even simple information from a relational database. This presents a potentially high burden to those parties who need to extract data from a database for management decisions, as well as a high computational burden for processing such queries, since join operations are notoriously slow in most relational database systems.

Figure 4:
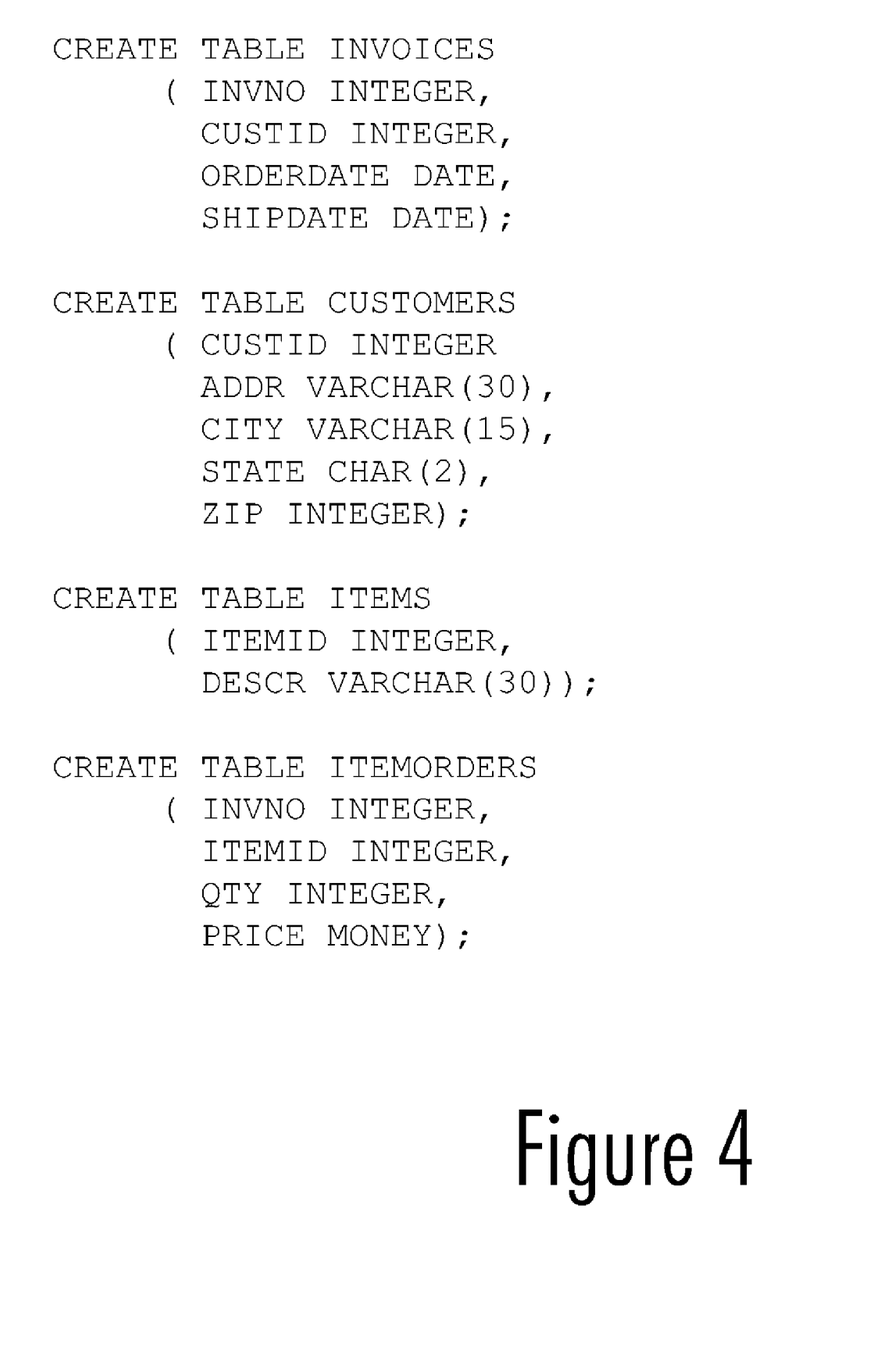
FIG. 4 is a diagram of an implementation in Structured Query Language (SQL) of a normalized relational database schema in the third normal form without explicit key constraints.
Figure 5:
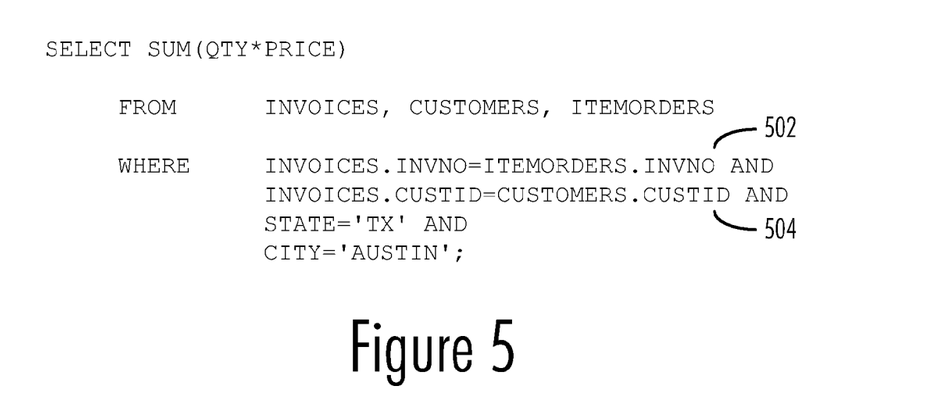
FIG. 5 is a diagram of an SQL query intended to be used in conjunction with either of the databases defined in FIGS. 3 and 4.

For example, FIG. 5 shows SQL code defining a query intended for use with the database defined in FIGS. 3 and 4 to determine the total revenue associated with sales in Austin, Tex. This query contains two join conditions, "INVOICES.INVNO=ITEMORDERS.INVNO" (line 502) and "INVOICES.CUSTID=CUSTOMERS.CUSTID" (line 504), which match invoice numbers in the table of invoices to the items ordered on each invoice and match customer ID numbers in the table of invoices to the customers' information in the table of customers, respectively. This query as a whole means, essentially, "Select those customers in the customers table with addresses in Austin, Tex. Match those customers' customer ID numbers to the customer ID numbers of their invoices in the invoices table, so as to pick out the invoice numbers associated with those customers. Next, for each of those invoice numbers, pick out the individual items ordered on each of those identified invoices (from the "ITEMORDERS" table). For each of those item orders, multiply the quantity ordered of that item by the price. Finally, add up the multiplication results for all of the items to get the total revenue." What makes this query complicated is the fact that two join operations must be performed, since at each join operation, each tuple in one table must have one or more of its attributes matched to a tuple in another table. Depending on how the tables are organized, each join operation can take as many as m×n compare operations (where m is the number of tuples in one table and n is the number of tuples in the other). Obviously, the computational complexity of a given query can become quite large where there are multiple join operations to be performed, particularly when one considers that, in many cases, the multiple join operations may be performed in an arbitrary order with no loss of correctness (e.g., in the example in FIG. 5, it would be no less correct to first match all invoices with their respective ordered items, then match the matched invoices and items to their respective customers, then filter out all but the "Austin, Tex." tuples, although one would expect processing the query in this order to be much less efficient).

To address the increased complexity of query processing vis-à-vis database updates, the concept of a "data warehouse" (as opposed to a "database") was introduced. The fundamental difference between a database and a data warehouse is that a database is designed for supporting data updates (transactions), whereas a data warehouse is specially tailored to performing queries on existing data. The basic idea behind the "data warehouse" concept is that once a collection of data has been accumulated over a given time period, there comes a point where that data will no longer change. For example, in a "product orders" database such as is described in FIGS. 2-4, once the orders for a given time period have been processed and recorded, at some point the information about those orders will not change—they merely become historical data. At this point, those pieces of information that are not subject to future change can be placed in a "data warehouse," where they are organized for optimal data retrieval and analysis, as opposed to efficient transaction processing. Two terms that are frequently used to describe this distinction are "On-Line Analytical Processing" (OLAP) and "On-Line Transaction Processing" (OLTP). In general, data warehouses are designed for OLAP, whereas databases are designed for OLTP.

One particularly useful concept in data warehousing is the "multidimensional" storage model, in which data are conceptualized as existing in a multidimensional space (such as a mathematical vector space). Such a model is particularly useful for correlating data to particular time periods and locations. In the previous example of product orders, for instance, sales revenue data could be organized in a multidimensional model where one dimension represents "time," another dimension represents "location," and yet another dimension represents the particular product in question. This multidimensional approach is particularly useful where it is desirable to group items of data according to particular subdivisions of a dimension (e.g., grouping sales revenue by week, month, quarter, or year).

Figure 6:
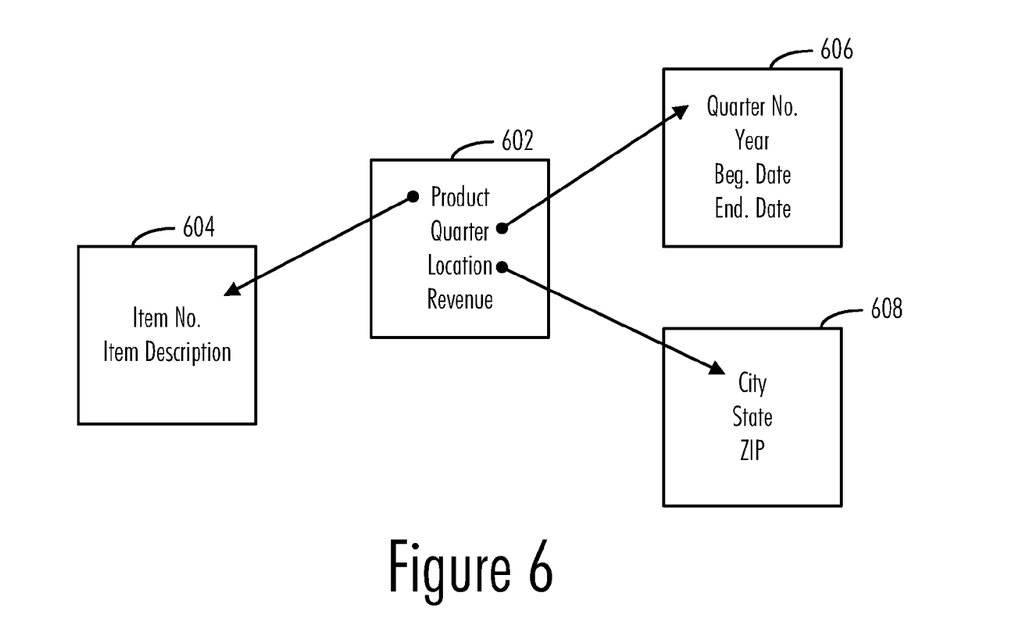
FIG. 6 is a diagram of a star schema.

In practice, multidimensional modeling is often performed in the context of a relational database management system through the use of "fact tables" and "dimension tables." A dimension table consists of tuples of attributes of a particular dimension. For example, a dimension table for a "quarter" (unit of time) dimension may include such attributes as "quarter number" and "year." A fact table consists of measurement fields (such as "gross revenue") and pointers to tuples in the dimension tables associated with the fact table (e.g., a pointer to a tuple in the "quarter" dimension table to denote the quarter in which the gross revenue amount in a fact table tuple occurred, a pointer to a tuple in the "location" dimension table to denote where the gross revenue was earned, etc.) A fact table, together with a set of dimension tables the fact table references, is generally known as a "star schema." An example of such a star schema is provided in FIG. 6, where fact table 602 contains tuples that consist of a single measurement field (revenue) and pointers to tuples in various dimension tables 604, 606, and 608.

Figure 7:
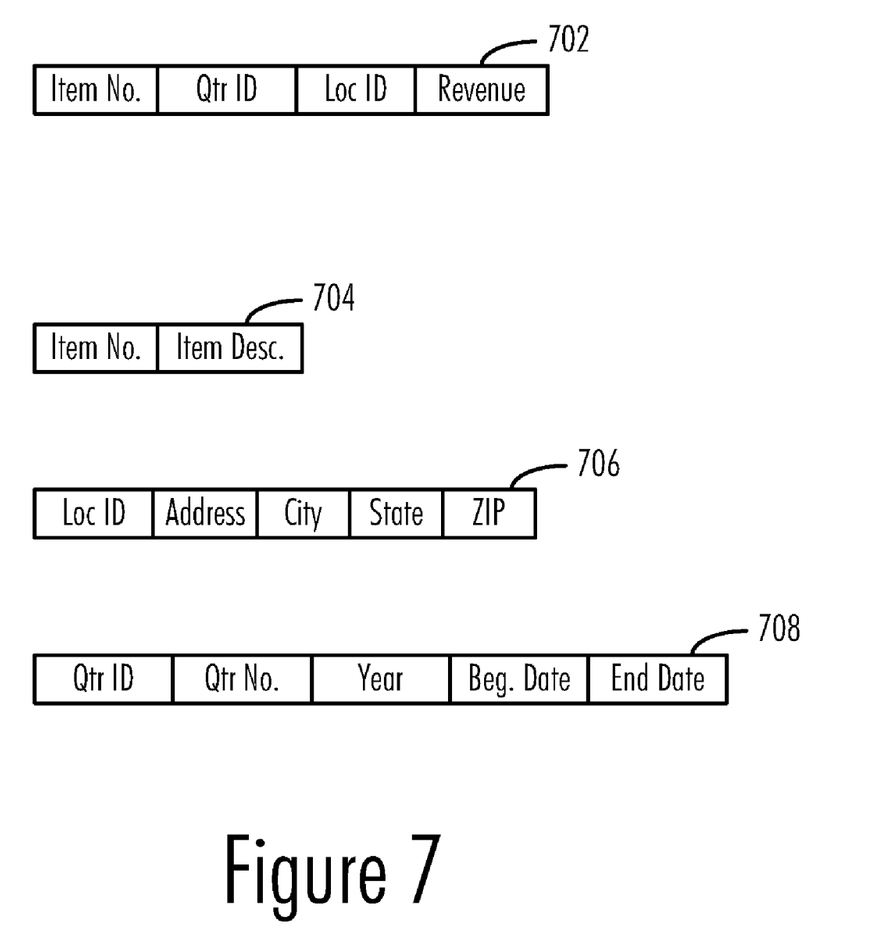
FIG. 7 is a diagram of a relational database implementation of a star schema.

One of the advantages to using a star schema to implement a data warehouse is that the schema may be implemented by defining the fact and dimension tables in a relational database management system (using SQL, for instance). FIG. 7 is a diagram of a star schema, based on FIG. 6, as implemented using tables in a relational database management system. In the example provided in FIG. 7, fact table 702 references dimension tables 704, 706, and 708 through the use of foreign keys (namely, "Item No.," "Loc ID," and "Qtr ID").

One of the challenges in making practical use of data warehousing is in reorganizing the data collected in a traditional relational database into a multidimensional structure, such as a star schema. This task is usually performed manually (by a database designer or programmer, for example). In a commercial setting, where the source database may be very large and complex, the task of defining a star schema to warehouse data from a given database may be very difficult, particularly if the original database schema is not well documented.

What is needed, therefore, is a tool for assisting a database designer with developing a star schema from a given relational database schema. The present invention provides a solution to this and other problems, and offers other advantages over previous solutions.

SUMMARY OF THE INVENTION

Accordingly, the present invention provides a method, computer program product, and data processing system for computer-aided design of multidimensional data warehouse schemas. In particular, a preferred embodiment of the present invention provides a software tool for identifying one or more potential latent star schema structures within an existing database. This software tool performs a heuristic analysis of an existing relational database schema to locate potential primary keys, foreign keys, and measurement fields in the existing schema. Database tables within the existing schema are scored heuristically as to their suitability as fact tables based on the key candidates and measurement fields. For each potential fact table, other tables from the existing schema are identified as being possible dimension tables. Data from the database is then used to test the suitability of the identified candidate fact tables and dimension tables. The identified candidate fact tables and their associated dimension table candidates are then reported to the user to reveal a latent star schema structure, which can be used as the basis of a data warehouse design.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 8:
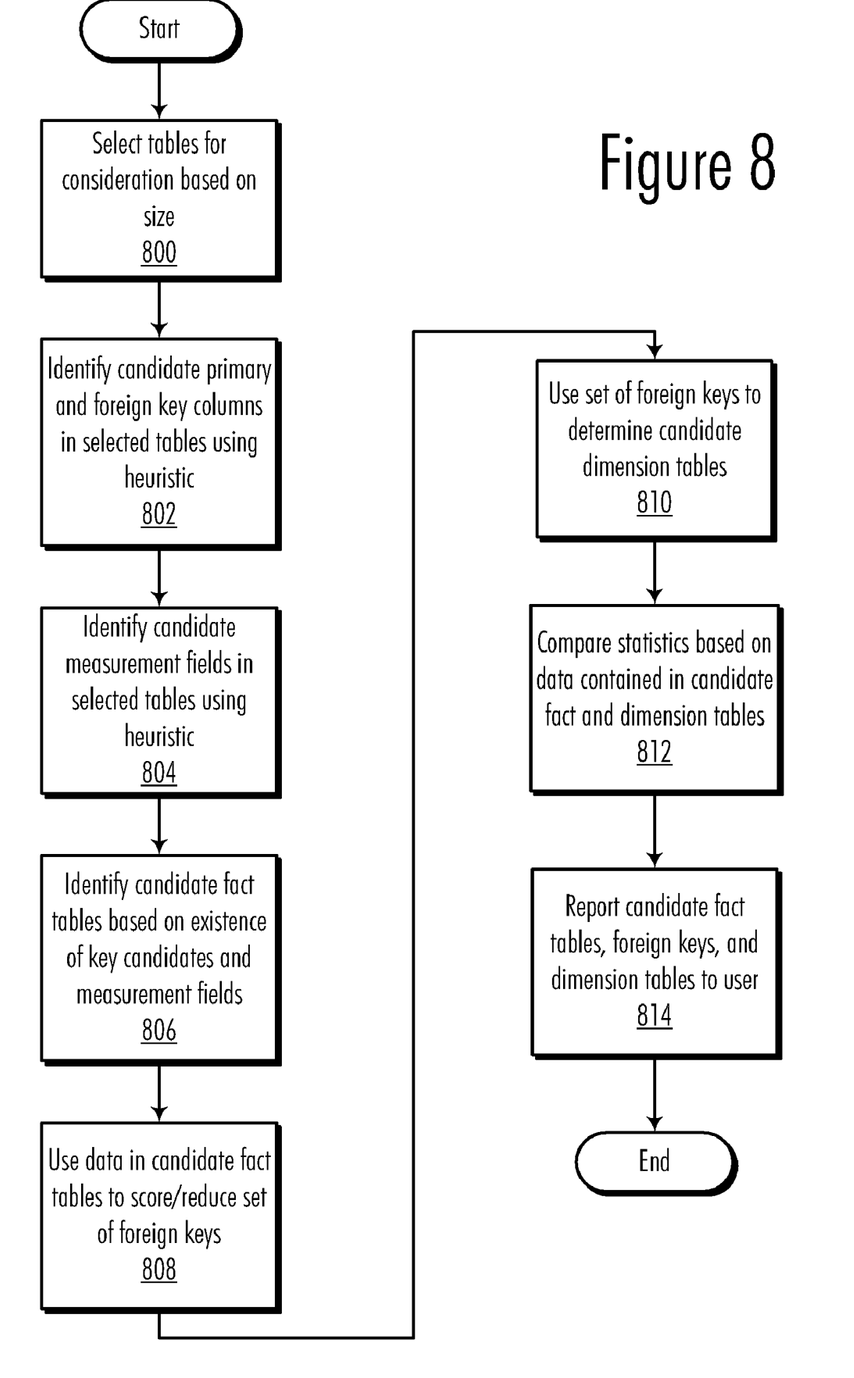
FIG. 8 is a flowchart representation of a process of identifying a latent star structure in a relational database schema in accordance with a preferred embodiment of the present invention.

FIG. 8 is a flowchart representation of a process of identifying a latent star schema structure in a relational database in accordance with a preferred embodiment of the present invention. As a preliminary step, a measure of "table size" for each table in the relational database is determined so that subsequent scoring of database tables is performed only on tables of or above a pre-determined (possibly user-defined) size, so as to reduce the number of tables to be considered (block 800). Here "table size" may be defined in a number of ways. One particular definition is the number of table rows (tuples) multiplied by the average column size of the table. Other suitable measures include, but are not limited to, table row counts and table column counts, as well as any number of functions of the aforementioned measures.

Next, from those tables above the minimum size, candidate primary/foreign key columns are selected according to heuristic criteria (block 802). A heuristic criterion is a "rule of thumb" that can be used to provide a score or ranking among a set of various alternatives where it is either impossible or impractical to obtain an exact or optimal answer. A set of heuristic criteria for identifying key candidates in a preferred embodiment of the present invention may be applied by evaluating a "heuristic function" to assign a score to each column (attribute) in the database tables under consideration according to the criteria being applied.

Heuristic functions are widely used in computer game playing and other applications generally classified in the field of "artificial intelligence." For example, chess-playing computer programs use heuristic functions to decide whether a given position favors one player or another; the score the computer assigns to a given position will depend on a number of factors, such as the relative value of the pieces/pawns one player has on the board as compared to the other player (material advantage), the number of squares a given player's pieces and pawns control (spatial advantage), pawn structure, and so forth. Chess programs use these sorts of heuristic functions to rate the relative values of potential moves based on the level of advantage to a player predicted by the heuristic function.

Similarly, in a preferred embodiment of the present invention, a heuristic function is used to score table attributes (columns) based on their suitability as foreign/primary keys according to defined heuristic criteria. Such criteria may include, but are not limited to, the following: 1.) the column datatype is an enumerable datatype (i.e., a datatype where each value has a well-defined successor value, such as integer, character, string, date, etc.); 2.) the column datatype is not a floating-point, decimal number, or large object type (e.g., double, float, decimal, money, lob, blob, clob, etc.); 3.) the column datatype conforms to database management system vendor standards for valid key constraints; 4.) any user-defined datatypes must be composed of datatypes that can serve as keys; 5.) the column name contains a prefix, suffix, or other string that suggests that the column may function as a key (e.g., "ID," "Key," "Date," "ZIP," etc.); and 6.) the column name appears in other tables of the same or a related schema in the database. One skilled in the art will recognize that any of a virtually limitless variety of heuristic functions may be crafted to score attributes according to some or all of these criteria.

Figure 9:
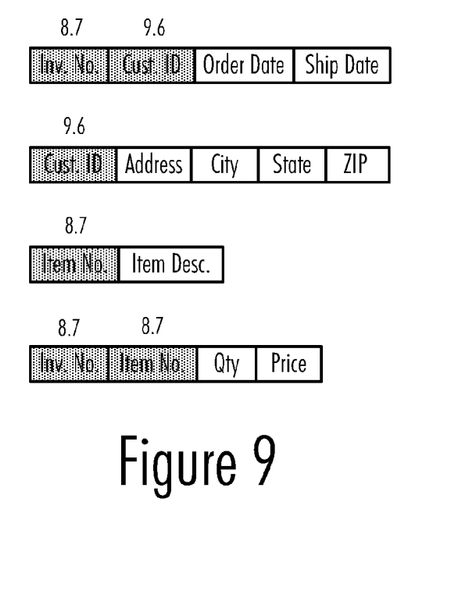
FIG. 9 is a diagram illustrating scoring of key candidates in a source relational database in accordance with a preferred embodiment of the present invention.

FIG. 9 shows a possible result of scoring attributes from the database schema in FIG. 2 using a heuristic function to identify potential foreign/primary key candidates. In FIG. 9 such key candidates are shown shaded, with a numerical score, representing the numerical result of the heuristic function used to score the candidate keys.

Next, the attributes (columns) of the database schema are scored according to another set of heuristic criteria to identify potential measurement fields (block 804). Recall that measurement fields represent numerical measurements reported in fact tables. Hence, heuristic criteria for the identification of measurement fields may include, but are not limited to, the following: 1.) the attribute has a numeric datatype; 2.) the attribute has a floating point or decimal data type; 3.) a user-defined datatype is constructed from numeric base datatypes; 4.) the attribute name contains a prefix, suffix, or other identifiable string that indicates that the attribute is a measurement (e.g., "Avg," "Min," "Max," "Count," "Freq," "Num," "Amt," "Gross," "Net," etc.).

Figure 10:
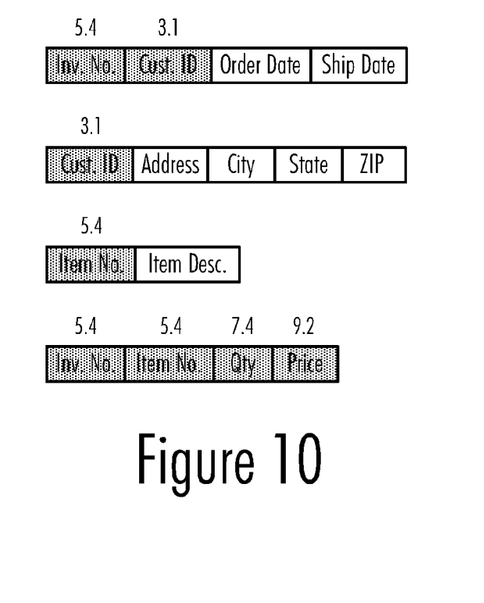
FIG. 10 is a diagram illustrating scoring of measurement field candidates in a source relational database in accordance with a preferred embodiment of the present invention.

FIG. 10 shows a possible result of scoring attributes from the database schema in FIG. 2 using a heuristic function to identify potential measurement fields. In FIG. 10 such key candidates are shown shaded, with a numerical score, representing the numerical result of the heuristic function used to score the measurement fields. Note that, when examined in conjunction with FIG. 9, there exist a number of fields that appear both as potential keys and as potential measurement fields, due to their numeric content.

Figure 11:
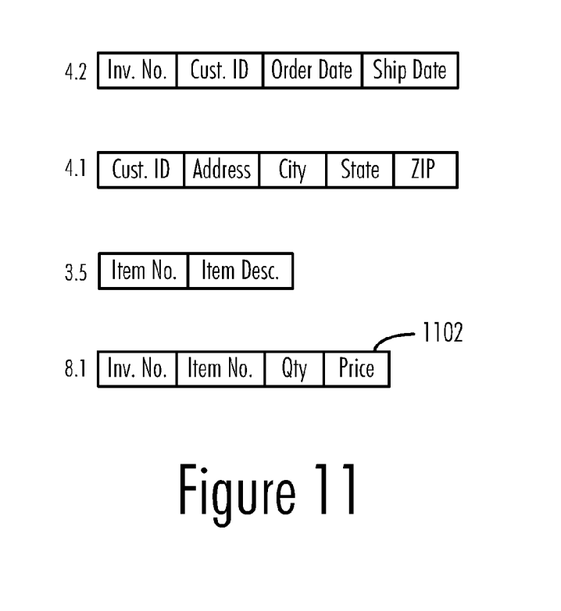
FIG. 11 is a diagram illustrating scoring of candidate fact tables in a source relational database in accordance with a preferred embodiment of the present invention.

Using the candidate keys and measurement fields now identified, the database tables themselves are then scored heuristically to identify potential fact tables (block 806). A table is likely to be suitable as a fact table if it contains a fair number of measurement fields and foreign keys. FIG. 11 is a diagram illustrating a result of scoring database tables in the FIG. 2 database as potential fact tables, based on the key candidates and potential measurement fields identified in FIGS. 9 and 10. In this example, table 1102 receives the highest score, since it contains two attributes that were identified as non-foreign-key potential measurement fields ("Qty" and "Price") in addition to two candidate foreign keys ("Inv. No." and "Item No."). Hence, table 1102 is considered to be the most likely candidate fact table, while other tables are not considered to be very likely fact table candidates. Note that in a real-life example involving a larger database, there may be several tables that would be appropriate fact table candidates—in this small example, we assume that only one table is chosen as a candidate fact table (thus, generating only one "star" in the eventual schema). One skilled in the art will recognize, however, that in general, multiple fact tables, and hence multiple stars (a "constellation"), will be selected.

Next, the actual data in the candidate fact tables is used to verify that the suitability of the key candidates chosen to be primary/foreign keys (block 808). This verification takes a partially heuristic approach in that certain columns can be immediately disqualified as keys (i.e., they can be proven not to be useable as keys), while other columns can only be demonstrated to have less usefulness as keys. Specifically, a column cannot be a key if there are any nulls in the data for that column (i.e., a column can only function as a key if there if that column has an actual value in every row of the table). Those candidate key columns that do not contain any nulls are then scored according to the usefulness of that column as a key according to another set of heuristic criteria. These criteria may include, but are not limited to, the following: 1.) a column is not useful as a foreign key if the column has the same value in every row of the candidate fact table; 2.) a column is not useful as a foreign key if the column has only a few possible values (as compared to the number of rows in the candidate fact table).

Next, for each of the key candidates (and associated fact tables) that survive the previous step, a set of one or more candidate dimension tables for a fact table is identified using another set of heuristic criteria (block 810). These heuristic criteria may include, but are not limited to, the following: 1.) a table is a good dimension table if the column containing the associated candidate key contains no null values; 2.) a table is a good dimension table if every value of the associated candidate key that can be found in the fact table is in the proposed dimension table; 3.) a table is a good dimension table if the number of unique values for the candidate key in the proposed dimension table equals the number of rows in the proposed dimension table (i.e., each value of the candidate key in the proposed dimension table appears only once); 4.) a table is a good dimension table if a group of columns in the proposed dimension table, if considered together as a key, would have no duplicates in the proposed dimension table (i.e., each combination of values for the group of columns appearing the proposed dimension table appears only once).

Once a set of candidate dimension tables has been identified, a statistical comparison of the data in the candidate fact and dimension tables is performed to verify the suitability of the key candidates chosen (block 812). During this analysis, certain foreign keys are eliminated from inclusion in the eventual star schema, where such foreign keys are deemed to be unsuitable after comparing the data in the fact and dimension tables. Heuristic criteria used for selecting which keys to eliminate include, but are not limited to, the following: 1.) if the range of values for the key in the fact table are not a good distribution over the number of values in the key's column in the associated dimension table, the key may be eliminated from inclusion in the star schema; 2.) if the key values in the fact table are skewed toward one value or range of values, the key may be eliminated from inclusion in the star schema; 3.) if the key values in the fact table are skewed away from the expected median (as determined by examining the dimension table), the key may be eliminated from inclusion in the star schema.

Figure 13:
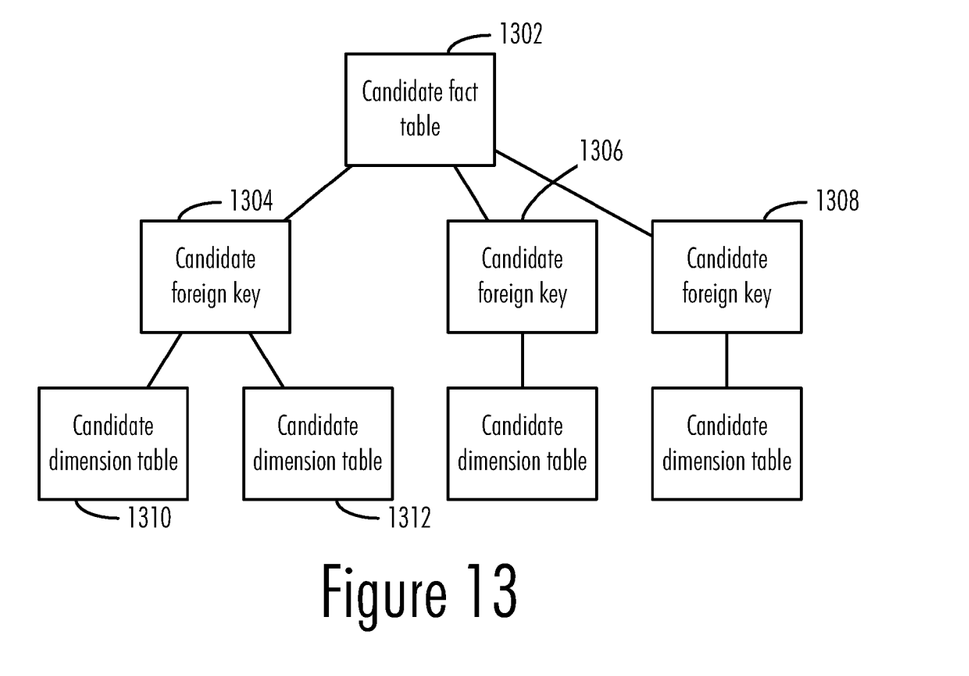
FIG. 13 is a diagram of a representation of a latent star schema uncovered using the process described in FIG. 8 in accordance with a preferred embodiment of the present invention.

Following the statistical analysis step, the result of this process, as depicted in FIG. 13, is a list of fact tables (e.g., fact table 1302), where for each fact table there is a list of key candidates (e.g., key candidates 1304, 1306, and 1308), and for each key candidate, a list of dimension table candidates (e.g., dimension table candidates 1310 and 1312, associated with key candidate 1304). As a final step in the process described in FIG. 8, these results are reported to the user, who may make use of this discovered star schema structure as a basis for constructing a full data warehouse for storing information obtained from the source database (block 814).

Figure 12:
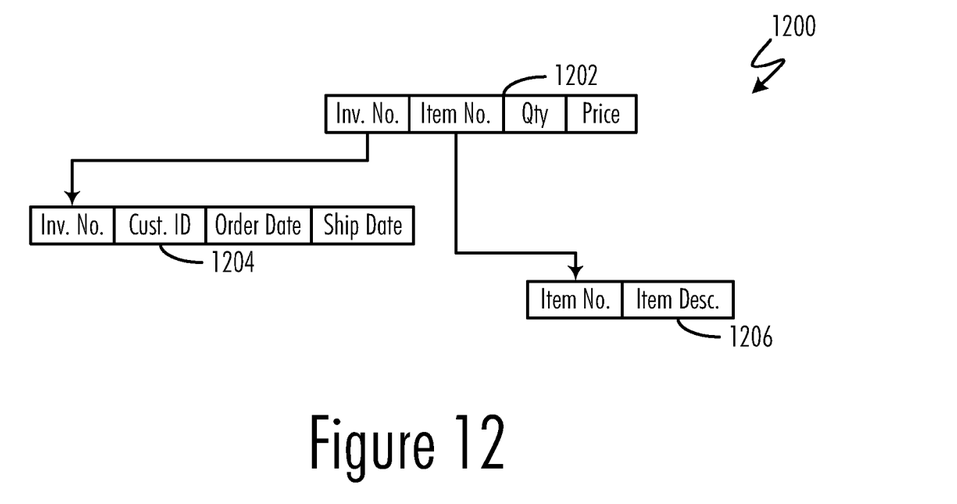
FIG. 12 is a diagram illustrating a star schema discovered using the process of FIG. 8, and in particular, using the intermediate results described in FIGS. 9-11, in accordance with a preferred embodiment of the present invention.

Returning now to the example database from FIGS. 9-11, an example star schema 1200 identified through the process described above in conjunction with FIG. 8 is depicted in FIG. 12. Fact table 1202 references dimension tables 1204 and 1206 through the identified foreign keys "Inv. No." and "Cust. ID." Once this star schema is communicated to the user, the user may design a customized star schema from the computer-designed basic structure (schema 1200).

Figure 14:
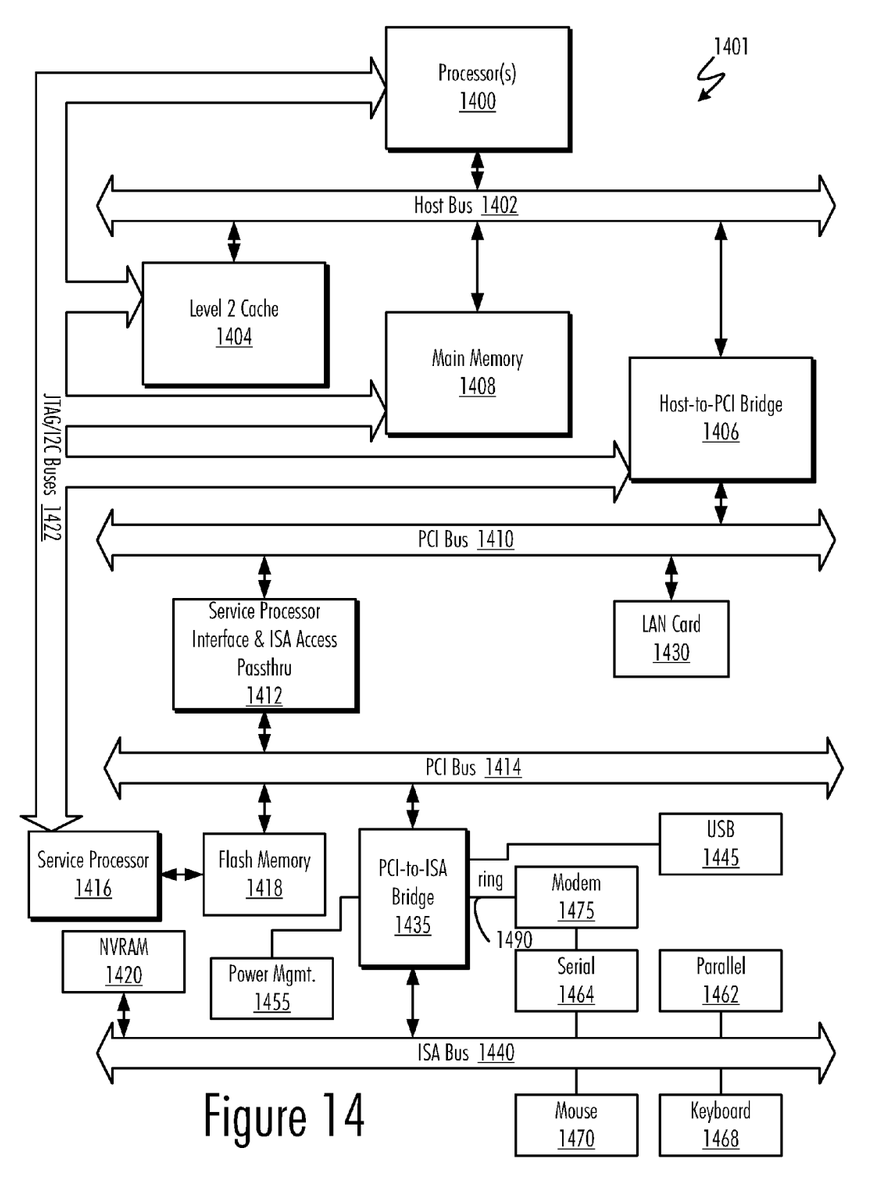
FIG. 14 is a diagram of a data processing system in which the processes of the present invention may be implemented.

FIG. 14 illustrates information handling system 1401 which is a simplified example of a computer system/data processing system capable of performing the computing operations described herein with respect to a preferred embodiment of the present invention. Computer system 1401 includes processor 1400 which is coupled to host bus 1402. A level two (L2) cache memory 1404 is also coupled to host bus 1402. Host-to-PCI bridge 1406 is coupled to main memory 1408, includes cache memory and main memory control functions, and provides bus control to handle transfers among PCI bus 1410, processor 1400, L2 cache 1404, main memory 1408, and host bus 1402. Main memory 1408 is coupled to Host-to-PCI bridge 1406 as well as host bus 1402. Devices used solely by host processor(s) 1400, such as LAN card 1430, are coupled to PCI bus 1410. Service Processor Interface and ISA Access Pass-through 1412 provides an interface between PCI bus 1410 and PCI bus 1414. In this manner, PCI bus 1414 is insulated from PCI bus 1410. Devices, such as flash memory 1418, are coupled to PCI bus 1414. In one implementation, flash memory 1418 includes BIOS code that incorporates the necessary processor executable code for a variety of low-level system functions and system boot functions.

PCI bus 1414 provides an interface for a variety of devices that are shared by host processor(s) 1400 and Service Processor 1416 including, for example, flash memory 1418. PCI-to-ISA bridge 1435 provides bus control to handle transfers between PCI bus 1414 and ISA bus 1440, universal serial bus (USB) functionality 1445, power management functionality 1455, and can include other functional elements not shown, such as a real-time clock (RTC), DMA control, interrupt support, and system management bus support. Nonvolatile RAM 1420 is attached to ISA Bus 1440. Service Processor 1416 includes JTAG and I2C buses 1422 for communication with processor(s) 1400 during initialization steps. JTAG/I2C buses 1422 are also coupled to L2 cache 1404, Host-to-PCI bridge 1406, and main memory 1408 providing a communications path between the processor, the Service Processor, the L2 cache, the Host-to-PCI bridge, and the main memory. Service Processor 1416 also has access to system power resources for powering down information handling device 1401.

Peripheral devices and input/output (I/O) devices can be attached to various interfaces (e.g., parallel interface 1462, serial interface 1464, keyboard interface 1468, and mouse interface 1470 coupled to ISA bus 1440. USB hub 1445, for instance, is shown connected to a media reader 1446 for the purpose of reading machine-readable tangible data storage media, such as memory cards, optical discs, and the like. Alternatively, many I/O devices can be accommodated by a super I/O controller (not shown) attached to ISA bus 1440.

In order to attach computer system 1401 to another computer system to copy files over a network, LAN card 1430 is coupled to PCI bus 1410. Similarly, to connect computer system 1401 to an ISP to connect to the Internet using a telephone line connection, modem 1475 is connected to serial port 1464 and PCI-to-ISA Bridge 1435.

While the computer system described in FIG. 14 is capable of executing the processes described herein, this computer system is simply one example of a computer system. Those skilled in the art will appreciate that many other computer system designs are capable of performing the processes described herein.

One of the preferred implementations of the invention is a computer program, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an;" the same holds true for the use in the claims of definite articles. Where the word "or" is used in the claims, it is used in an inclusive sense (i.e., "A and/or B," as opposed to "either A or B").

What is claimed is:

1. A computer-performed method of discovering a latent organizational structure of a relational database, the method comprising:
   selecting, by a computer, a plurality of key candidates from a plurality of relational database tables, wherein the key candidates are selected using a first set of heuristic criteria;
   selecting, by the computer, one or more fact table candidates in the plurality of relational database tables based on said fact table candidates containing key candidates from the plurality of key candidates;
   selecting, by the computer, one or more dimension table candidates based on the plurality of key candidates and a second set of heuristic criteria; and
   presenting, by the computer to a user of the computer, the one or more fact table candidates, the key candidates, and the one or more dimension table candidates as a star schema.

2. The method of claim 1, further comprising:
   selecting, by the computer, one or more measurement field candidates from the plurality of relational database tables based on a third set of heuristic criteria; and
   selecting, by the computer, the one or more fact tables based on the fact table candidates containing the one or more field candidates in addition to key candidates from the plurality of key candidates.

3. The method of claim 2, wherein the third set of heuristic criteria includes a criterion wherein database table fields having numeric datatypes are favored as measurement field candidates.

4. The method of claim 1, wherein the first set of heuristic criteria includes a criterion wherein database table fields having enumerable datatypes are favored as key candidates.

5. The method of claim 1, wherein the first set of heuristic criteria includes a criterion wherein database table fields having names containing particular pre-specified strings are favored as key candidates.

6. The method of claim 1, wherein the first set of heuristic criteria includes a criterion wherein database table fields having names that appear in multiple tables from the plurality of relational database tables are favored as key candidates.

7. The method of claim 1, wherein the second set of heuristic criteria includes a criterion wherein a relational database table containing one of the plurality of key candidates as a field, where each value in said field appears only once in said relational database table, is favored as a dimension table candidate.

8. A computer program product in one or more tangible computer-readable storage media, comprising functional descriptive material that, when executed by a computer, causes the computer to perform actions of:
selecting a plurality of key candidates from a plurality of relational database tables, wherein the key candidates are selected using a first set of heuristic criteria;
selecting one or more fact table candidates in the plurality of relational database tables based on said fact table candidates containing key candidates from the plurality of key candidates;
selecting one or more dimension table candidates based on the plurality of key candidates and a second set of heuristic criteria; and
presenting, to a user of the computer, the one or more fact table candidates, the key candidates, and the one or more dimension table candidates as a star schema.

9. The computer program product of claim 8, comprising additional functional descriptive material that, when executed by the computer, causes the computer to perform actions of:
selecting one or more measurement field candidates from the plurality of relational database tables based on a third set of heuristic criteria; and
selecting the one or more fact tables based on the fact table candidates containing the one or more field candidates in addition to key candidates from the plurality of key candidates.

10. The computer program product of claim 9, wherein the third set of heuristic criteria includes a criterion wherein database table fields having numeric datatypes are favored as measurement field candidates.

11. The computer program product of claim 8, wherein the first set of heuristic criteria includes a criterion wherein database table fields having enumerable datatypes are favored as key candidates.

12. The computer program product of claim 8, wherein the first set of heuristic criteria includes a criterion wherein database table fields having names containing particular pre-specified strings are favored as key candidates.

13. The computer program product of claim 8, wherein the first set of heuristic criteria includes a criterion wherein database table fields having names that appear in multiple tables from the plurality of relational database tables are favored as key candidates.

14. The computer program product of claim 8, wherein the second set of heuristic criteria includes a criterion wherein a relational database table containing one of the plurality of key candidates as a field, where each value in said field appears only once in said relational database table, is favored as a dimension table candidate.

15. A data processing system comprising:
at least one processor;
data storage accessible to the at least one processor;
a set of instructions in the data storage, wherein the at least one processor executes the set of instructions to perform actions of
selecting a plurality of key candidates from a plurality of relational database tables, wherein the key candidates are selected using a first set of heuristic criteria;
selecting one or more fact table candidates in the plurality of relational database tables based on said fact table candidates containing key candidates from the plurality of key candidates;
selecting one or more dimension table candidates based on the plurality of key candidates and a second set of heuristic criteria; and
presenting, to a user of the data processing system, the one or more fact table candidates, the key candidates, and the one or more dimension table candidates as a star schema.

16. The data processing system of claim 15, wherein the at least one processor executes the set of instructions to perform additional actions of:
selecting one or more measurement field candidates from the plurality of relational database tables based on a third set of heuristic criteria; and
selecting the one or more fact tables based on the fact table candidates containing the one or more field candidates in addition to key candidates from the plurality of key candidates.

17. The data processing system of claim 15, wherein the first set of heuristic criteria includes a criterion wherein database table fields having enumerable datatypes are favored as key candidates.

18. The data processing system of claim 15, wherein the first set of heuristic criteria includes a criterion wherein database table fields having names containing particular pre-specified strings are favored as key candidates.

19. The data processing system of claim 15, wherein the first set of heuristic criteria includes a criterion wherein database table fields having names that appear in multiple tables from the plurality of relational database tables are favored as key candidates.

20. The computer program product of claim 8, wherein the second set of heuristic criteria includes a criterion wherein a relational database table containing one of the plurality of key candidates as a field, where each value in said field appears only once in said relational database table, is favored as a dimension table candidate.

* * * * *